United States Patent
Ahn et al.

(10) Patent No.: US 10,236,126 B2
(45) Date of Patent: *Mar. 19, 2019

(54) MULTILAYERED CERAMIC CAPACITOR, MOUNTING STRUCTURE OF CIRCUIT BOARD HAVING THEREON MULTILAYERED CERAMIC CAPACITOR, PACKING UNIT FOR MULTILAYERED CERAMIC CAPACITOR

(71) Applicant: SAMSUNG ELECTRO-MECHANICS CO., LTD., Suwon-si, Gyeonggi-do (KR)

(72) Inventors: Young Ghyu Ahn, Suwon-si (KR); Sang Soo Park, Suwon-si (KR); Min Cheol Park, Suwon-si (KR); Byoung Hwa Lee, Suwon-si (KR)

(73) Assignee: Samsung Electro-Mechanics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/959,971

(22) Filed: Apr. 23, 2018

(65) Prior Publication Data

US 2018/0240597 A1     Aug. 23, 2018

Related U.S. Application Data

(63) Continuation of application No. 15/677,887, filed on Aug. 15, 2017, now Pat. No. 9,984,828, which is a
(Continued)

(30) Foreign Application Priority Data

Nov. 9, 2012    (KR) .................. 10-2012-0126449

(51) Int. Cl.
*H01G 4/30*      (2006.01)
*H01G 2/06*      (2006.01)
(Continued)

(52) U.S. Cl.
CPC ............... *H01G 4/30* (2013.01); *H01G 2/06* (2013.01); *H01G 2/065* (2013.01); *H01G 4/012* (2013.01);
(Continued)

(58) Field of Classification Search
CPC ......................................... H01G 4/30
See application file for complete search history.

(56) References Cited

U.S. PATENT DOCUMENTS 6,587,327 B1    7/2003   Devoe et al.
7,092,236 B2    8/2006   Lee et al.
(Continued)

FOREIGN PATENT DOCUMENTS

CN     1808649 A     7/2006
CN     101401177 A    4/2009
(Continued)

OTHER PUBLICATIONS

U.S. Notice of Allowance dated Feb. 8, 2018 issued in U.S. Appl. No. 15/677,887.
(Continued)

*Primary Examiner* — Eric W Thomas
(74) *Attorney, Agent, or Firm* — Morgan, Lewis & Bockius LLP

(57) ABSTRACT

There is provided a multilayered ceramic capacitor, including: a ceramic body; an active layer including a plurality of first and second internal electrodes; an upper cover layer; a lower cover layer formed below the active layer, the lower cover layer being thicker than the upper cover layer; first and second external electrodes; at least one pair of first and second internal electrodes repeatedly formed inside the lower cover layer, wherein, when A is defined as ½ of an overall thickness of the ceramic body, B is defined as a thickness of the lower cover layer, C is defined as ½ of an
(Continued)

overall thickness of the active layer, and D is defined as a thickness of the upper cover layer, a ratio of deviation between a center of the active layer and a center of the ceramic body, $(B+C)/A$, satisfies $1.063 \leq (B+C)/A \leq 1.745$.

10 Claims, 10 Drawing Sheets

Related U.S. Application Data continuation of application No. 14/731,229, filed on Jun. 4, 2015, now Pat. No. 9,793,053, which is a continuation of application No. 13/764,193, filed on Feb. 11, 2013, now Pat. No. 9,087,646.

(51) Int. Cl.
| | | |
|---|---|---|
| *H01G 4/012* | (2006.01) | |
| *H01G 4/12* | (2006.01) | |
| *H01G 4/248* | (2006.01) | |
| *H01G 4/38* | (2006.01) | |
| *H05K 1/11* | (2006.01) | |

(52) U.S. Cl.
CPC ............... *H01G 4/12* (2013.01); *H01G 4/248* (2013.01); *H01G 4/38* (2013.01); *H05K 1/111* (2013.01)

(56) References Cited

U.S. PATENT DOCUMENTS

| | | |
|---|---|---|
| 8,638,543 B2 | 1/2014 | Ahn et al. |
| 9,087,646 B2 * | 7/2015 | Ahn .................. H01G 4/30 |
| 9,793,053 B2 * | 10/2017 | Ahn .................. H01G 4/30 |
| 9,984,828 B2 * | 5/2018 | Ahn .................. H01G 4/30 |
| 2006/0158827 A1 | 7/2006 | Lee et al. |
| 2007/0279836 A1 | 12/2007 | Takashima et al. |
| 2009/0002918 A1 | 1/2009 | Kawasaki et al. |
| 2011/0141660 A1 | 6/2011 | Jeong et al. |
| 2013/0321981 A1 | 12/2013 | Ahn et al. |

FOREIGN PATENT DOCUMENTS

| | | |
|---|---|---|
| JP | H06-215978 A | 8/1994 |
| JP | H07-329915 A | 12/1995 |
| JP | 2002-231561 A | 8/2002 |
| JP | 2007-235170 A | 9/2007 |
| JP | H05-047591 B2 | 10/2012 |
| KR | 10-2006-0084770 A | 7/2006 |
| KR | 10-2011-0065625 A | 6/2011 |
| WO | 02052591 A2 | 7/2002 |

OTHER PUBLICATIONS

U.S. Office Action dated Sep. 1, 2017 issued in U.S. Appl. No. 15/677,887.
Korean Notice of Office Action dated Jan. 7, 2014 issued in Korean Patent Application No. 10-2012-0126449 (with English translation).
Chinese Office Action dated Feb. 3, 2016 issued in Chinese Patent Application No. 20130062444.3 (with English translation).
U.S. Notice of Allowance dated Jun. 30, 2017 issued in U.S. Appl. No. 14/731,229.

\* cited by examiner

MULTILAYERED CERAMIC CAPACITOR, MOUNTING STRUCTURE OF CIRCUIT BOARD HAVING THEREON MULTILAYERED CERAMIC CAPACITOR, PACKING UNIT FOR MULTILAYERED CERAMIC CAPACITOR

CROSS-REFERENCE TO RELATED APPLICATIONS

This application is a continuation of U.S. application Ser. No. 15/677,887, filed on Aug. 15, 2017, which is a continuation of U.S. patent application Ser. No. 14/731,229 filed on Jun. 4, 2015, now U.S. Pat. No. 9,793,053 issued on Oct. 17, 2017, which is a continuation of U.S. application Ser. No. 13/764,193 filed on Feb. 11, 2013, now U.S. Pat. No. 9,087,646 issued on Jul. 21, 2015, which claims the priority of Korean Patent Application No. 10-2012-0126449 filed on Nov. 9, 2012, in the Korean Intellectual Property Office, the disclosure of which is incorporated herein by reference.

BACKGROUND OF THE INVENTION

Field of the Invention

The present invention relates to a multilayered ceramic capacitor, a mounting structure of a circuit board having thereon the multilayered ceramic capacitor, a packing unit for the multilayered ceramic capacitor.

Description of the Related Art

A multilayered ceramic capacitor, a multilayered chip electronic component, is a chip-type condenser commonly mounted on the printed circuit boards of various electronic products, such as image display devices including a liquid crystal display (LCD) and a plasma display panel (PDP), computers, personal digital assistants (PDAs), mobile phones, and the like, implementing charging and discharging of electricity therein.

Multilayered ceramic capacitors (MLCCs) may be used as components of various electronic products due to a small size, high capacitance, and ease of mountability.

A multilayered ceramic capacitor may have a structure in which a plurality of dielectric layers and a plurality of internal electrodes having different polarities and having the dielectric layers interposed therebetween are alternately laminated with each other.

Since the plurality of dielectric layers have both piezoelectric and electrostrictive properties, a piezoelectric phenomenon may occur, causing vibrations among the internal electrodes when AC or DC voltage is applied to the multilayered ceramic capacitor.

Such vibrations may be transferred through external electrodes of the multilayered ceramic capacitor to a printed circuit board on which the multilayered ceramic capacitor is mounted, and the entire printed circuit board may become an acoustic reflection surface generating sound from the vibrations.

The sound generated by the vibrations may correspond to an audible frequency within the range of 20 to 20000 Hz, and this vibrating sound, frequently causing an unpleasant feeling in people is known as acoustic noise.

In order to reduce acoustic noise, products in which a lower cover layer of the multilayered ceramic capacitor is enlarged have been researched.

Generally, equivalent series inductance (ESL) is proportional to the area of a current loop.

Therefore, as described above, the multilayered ceramic capacitor in which a lower cover layer is enlarged can partially reduce acoustic noise, but may have higher ESL as compared with products of the related art of which the lower cover layer is relatively thin.

The related art document below illustrates improvement in ESL, but fails to disclose a structure in which a lower cover layer includes an internal electrode.

RELATED ART DOCUMENT

Korean Patent Laid-Open Publication No. 10-2006-0084770

SUMMARY OF THE INVENTION

An aspect of the present invention provides new measures capable of reducing noise generated due to vibrations caused by a piezoelectric phenomenon in a multilayered ceramic capacitor and maintaining ESL at a predetermined level or lower.

According to an aspect of the present invention, there is provided a multilayered ceramic capacitor, including: a ceramic body having a plurality of dielectric layers laminated therein; an active layer including a plurality of first and second internal electrodes having individual dielectric layers interposed therebetween to form capacitance, the first and second internal electrodes being alternately exposed through respective end surfaces of the ceramic body; an upper cover layer formed above the active layer; a lower cover layer formed below the active layer, the lower cover layer being thicker than the upper cover layer; first and second external electrodes covering both end surfaces of the ceramic body; and at least one pair of first and second internal electrodes repeatedly formed inside the lower cover layer with the dielectric layer interposed therebetween, the first and second internal electrodes being alternately exposed through both end surfaces of the lower cover layer, wherein, when A is defined as ½ of an overall thickness of the ceramic body, B is defined as a thickness of the lower cover layer, C is defined as ½ of an overall thickness of the active layer, and D is defined as a thickness of the upper cover layer, a ratio of deviation between a center of the active layer and a center of the ceramic body, (B+C)/A, satisfies $1.063 \leq (B+C)/A \leq 1.745$.

Here, a ratio of the thickness (D) of the upper cover layer to the thickness (B) of the lower cover layer, D/B, may satisfy $0.021 \leq D/B \leq 0.422$.

Here, a ratio of the thickness (B) of the lower cover layer to ½ (A) of the overall thickness of the ceramic body, B/A, may satisfy $0.329 \leq B/A \leq 1.522$.

Here, a ratio of ½ (C) of the overall thickness of the active layer to the thickness (B) of the lower cover layer, C/B, may satisfy $0.146 \leq C/B \leq 2.458$.

The first and second internal electrodes formed inside the lower cover layer may be formed adjacently to a bottom surface of the ceramic body.

Here, when E is defined as an overall thickness of the first and second internal electrodes formed inside the lower cover layer, a ratio of the overall thickness of the first and second internal electrodes formed inside the lower cover layer to the thickness of the lower cover layer, E/B, may be 0.5 or lower.

Here, when F is defined as a thickness from a lowermost edge of the first or second internal electrode formed inside the lower cover layer to a bottom surface of the ceramic body, F may be 100 μm or smaller.

Here, points of inflection formed on respective end surfaces of the ceramic body may be formed to have a height corresponding to or lower than a center of the ceramic body in the thickness direction, due to a difference between a deformation rate occurring in the center of the active layer and a deformation rate occurring in the lower cover layer, during the application of voltage thereto.

According to another aspect of the present invention, there is provided a mounting structure of a circuit board having a multilayered ceramic capacitor mounted thereon, the mounting structure including: a printed circuit board having first and second electrode pads formed thereon; and a multilayered ceramic capacitor mounted on the printed circuit board, wherein the multilayered ceramic capacitor includes: a ceramic body having a plurality of dielectric layers laminated therein; an active layer including a plurality of first and second internal electrodes having the dielectric layer interposed therebetween, the first and second internal electrodes being alternately exposed through both end surfaces of the ceramic body; an upper cover layer formed above the active layer; a lower cover layer formed below the active layer, the lower cover layer being thicker than the upper cover layer and having at least one pair of first and second internal electrodes alternately exposed through both end surfaces thereof; and first and second external electrodes formed on both end surfaces of the ceramic body to be electrically connected to exposed portions of the first and second internal electrodes and soldering-connected to first and second electrode pads; and wherein, when A is defined as ½ of an overall thickness of the ceramic body, B is defined as a thickness of the lower cover layer, C is defined as ½ of an overall thickness of the active layer, and D is defined as a thickness of the upper cover layer, a ratio of deviation between a center of the active layer and a center of the ceramic body, $(B+C)/A$, satisfies $1.063 \leq (B+C)/A \leq 1.745$.

Here, points of inflection formed on respective end surfaces of the ceramic body may be formed to have a height corresponding to or lower than soldering, due to a difference between a deformation rate occurring in the center of the active layer and a deformation rate occurring in the lower cover layer, during the application of voltage thereto.

According to another aspect of the present invention, there is provided a packing unit for a multilayered ceramic capacitor, the packing unit including: one or more multilayered ceramic capacitors, the one or more multilayered ceramic capacitors including: a ceramic body having a plurality of dielectric layers laminated therein; an active layer including a plurality of first and second internal electrodes having the dielectric layer interposed therebetween, the first and second internal electrodes being alternately exposed through both end surfaces of the ceramic body; an upper cover layer formed above the active layer; a lower cover layer formed below the active layer, the lower cover layer being thicker than the upper cover layer and having at least one pair of first and second internal electrodes alternately exposed through both end surfaces thereof; and first and second external electrodes formed on both end surfaces of the ceramic body and electrically connected to exposed portions of the first and second internal electrodes, wherein when A is defined as ½ of an overall thickness of the ceramic body, B is defined as a thickness of the lower cover layer, C is defined as ½ of an overall thickness of the active layer, and D is defined as a thickness of the upper cover layer, a ratio of deviation between a center of the active layer and a center of the ceramic body, $(B+C)/A$, satisfies $1.063 \leq (B+C)/A \leq 1.745$; and a packing sheet having a plurality of receiving parts in which the multilayered ceramic capacitors are respectively received, the lower cover layer of the multilayered ceramic capacitor facing a bottom surface of the receiving part.

The packing unit may further include a packing film attached to one surface of the packing sheet so as to seal the receiving parts in which the multilayered ceramic capacitors are respectively received.

The packing sheet may be wound as a reel.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
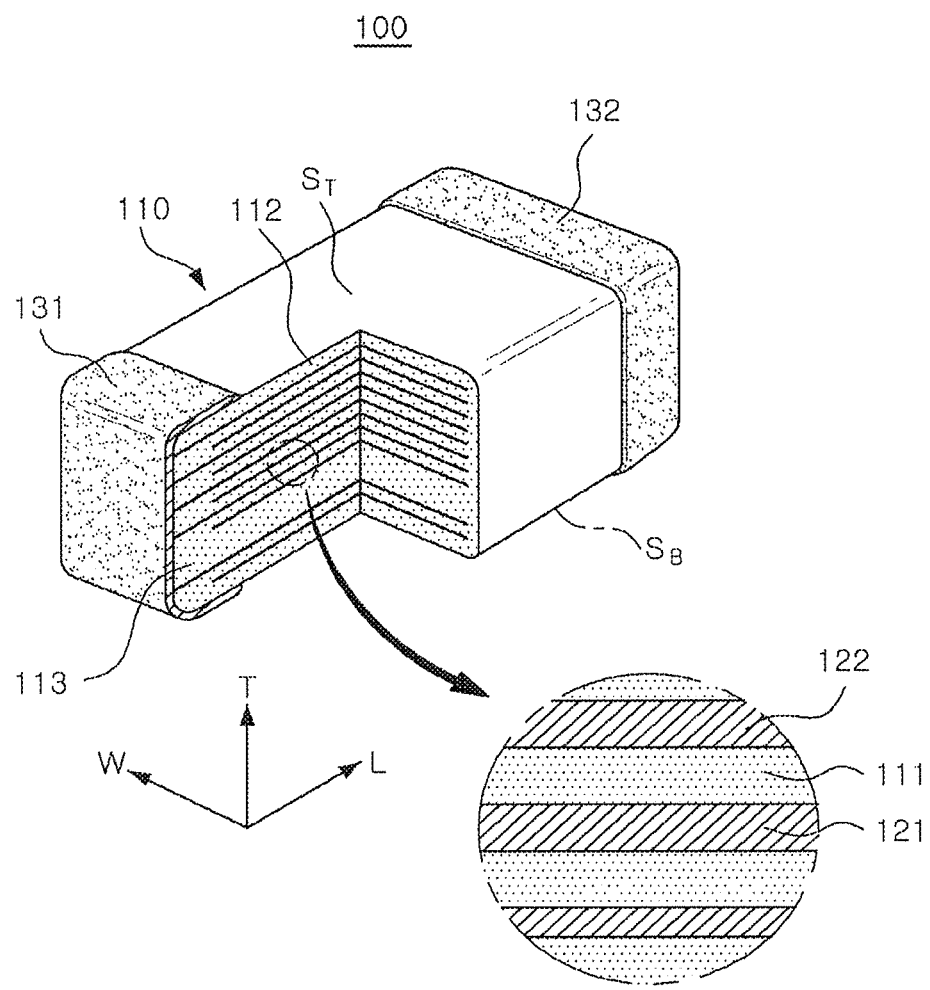
FIG. 1 is a partially cutaway perspective view schematically showing a multilayered ceramic capacitor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

When directions of a hexahedron are defined in order to clearly describe embodiments of the present invention, L, W, and T directions, shown in the drawings, indicate length, width, and thickness directions, respectively. Here, the thickness direction may be used to have the same concept as a lamination direction in which dielectric layers are laminated.

In addition, in the present embodiments, end surfaces of a ceramic body in a length direction thereof, on which first and second external electrodes are formed, are defined as both end surfaces, and surfaces perpendicular to the end surfaces are defined as side surfaces.

Multilayered Ceramic Capacitor

Figure 2:
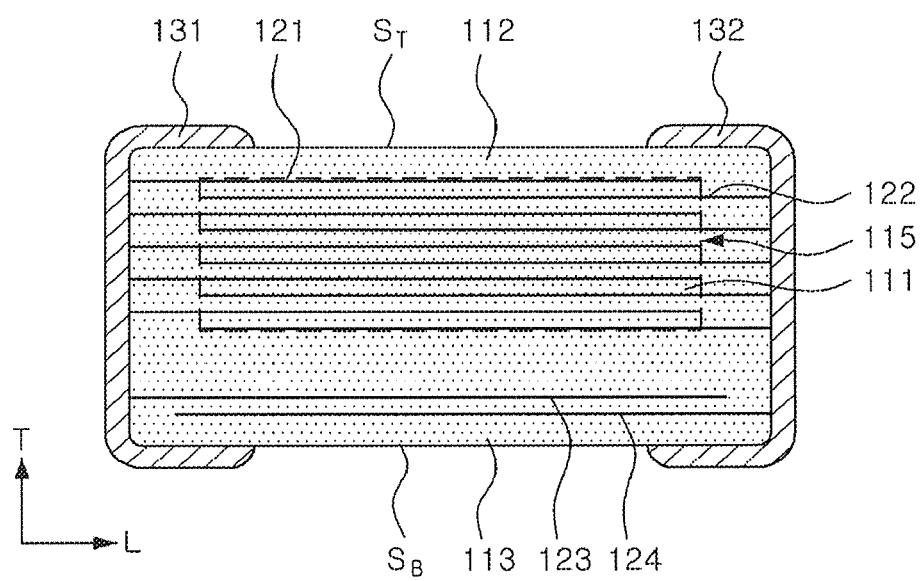
FIG. 2 is a cross-sectional view showing the multilayered ceramic capacitor of FIG. 1, cut in the length direction thereof.

Referring to FIGS. 1 and 2, a multilayered ceramic capacitor 100 according to an embodiment of the present invention may include a ceramic body 110, an active layer 115 having first and second internal electrodes 121 and 122, upper and lower cover layers 112 and 113, and first and second external electrodes 131 and 132 formed to cover both end surfaces of the ceramic body 110. At least one pair of first and second internal electrodes may be formed inside the lower cover layer 113.

The ceramic body 110 may be formed by laminating and firing a plurality of dielectric layers 111. The shapes, dimensions, and the number of stacked dielectric layers 111, of the ceramic body 110 are not limited to those described in the present embodiment.

The plurality of dielectric layers 111 constituting the ceramic body 110 are in a sintered state, and boundaries between adjacent dielectric layers 111 may be integrated such that they may not be readily apparent without the use of a scanning electron microscope (SEM).

The ceramic body 110 may be composed of the active layer 115 contributing to capacitance formation and the upper cover layer 112 and the lower cover layer 113 as margin parts, formed above and below the active layer 115.

The active layer 115 may be formed by repeatedly laminating a plurality of first and second internal electrodes 121 and 122 with the dielectric layer 111 between the first internal electrode and the second internal electrode.

Here, the thickness of the dielectric layer 111 may be optionally changed according to the design of capacitance of the multilayered ceramic capacitor 100, and the thickness of one layer may be 0.01 to 1.00 μm after firing, but the present invention is not limited thereto.

In addition, the dielectric layer 111 may contain ceramic powder having a high dielectric constant, for example, barium titanate ($BaTiO_3$) based powder or strontium titanate ($SrTiO_3$) based powder, but the present invention is not limited thereto.

The upper cover layer 112 and the lower cover layer 113 may have the same material and constitution as the dielectric layer 111, except that the internal electrodes are not included therein.

The upper cover layer 112 and the lower cover layer 113 may be formed by laminating a single dielectric layer or two or more dielectric layers on upper and lower surfaces of the active layer 115 in upper and lower directions, respectively. The upper cover layer 112 and the lower cover layer 113 may basically serve to prevent damage of the first and second internal electrodes 121 and 122 due to physical or chemical stress.

In addition, the lower cover layer 113 may be thicker than the upper cover layer 112 by further increasing the number of laminated dielectric layers as compared with the upper cover layer 112.

Here, since equivalent series inductance (ESL) is proportional to the area of a current loop, the lower cover layer 113 of the multilayered ceramic capacitor may be enlarged to thereby reduce vibrations of the internal electrodes and thus reduce acoustic noise, but in that case, ESL may be increased.

However, in the present embodiment, acoustic noise may be reduced and ESL may be maintained at a predetermined level or lower by forming at least one pair of first and second internal electrodes 123 and 124 inside the lower cover layer 113.

This effect of preventing ESL reduction may further be improved when the first and second internal electrodes 123 and 124 formed inside the lower cover layer 113 are formed more adjacently to a lower end of the lower cover layer 113.

The first and second internal electrodes 121 and 122 are a pair of electrodes having different polarities, and may be formed by printing conductive paste containing conductive metal at a predetermined thickness on the dielectric layers 111 such that the first and second internal electrodes 121 and 122 are alternately exposed through both end surfaces of the ceramic body in a lamination direction in which the dielectric layers 111 are stacked. The first and second internal electrodes 121 and 122 may be electrically insulated from each other by the dielectric layers 111 disposed therebetween.

That is, the first and second internal electrodes 121 and 122 may be electrically connected to the first and second external electrodes 131 and 132 through portions thereof alternately exposed through both end surfaces of the ceramic body 110.

Therefore, when voltages are applied to the first and second external electrodes 131 and 132, charges are stored between the first and second internal electrodes 121 and 122 facing each other. Here, the capacitance of the multilayered ceramic capacitor 100 may be proportional to the area of an overlapping region of the first and second internal electrodes 121 and 122.

The thickness of each of the first and second internal electrodes 121 and 122 may be determined depending on the usage thereof, and for example, may be determined within a range of 0.2 to 1.0 μm in consideration of the size of the ceramic body 110. However, the present invention is not limited thereto.

In addition, conductive metal contained in the conductive paste for forming the first and second internal electrodes 121 and 122 may be nickel (Ni), copper (Cu), palladium (Pd), or an alloy thereof, but the present invention is not limited thereto.

In addition, the conductive paste may be printed by a screen printing method, a gravure printing method, or the like, but the present invention is not limited thereto.

The first and second external electrodes 131 and 132 may be formed of a conductive paste containing a conductive metal. The conductive metal may be nickel (Ni), copper (Cu), palladium (Pd), gold (Au), or an alloy thereof, but the present invention is not limited thereto.

Hereinafter, the relationship between dimensions of components included in the multilayered ceramic capacitor according to the present embodiment and acoustic noise will be described.

Figure 3:
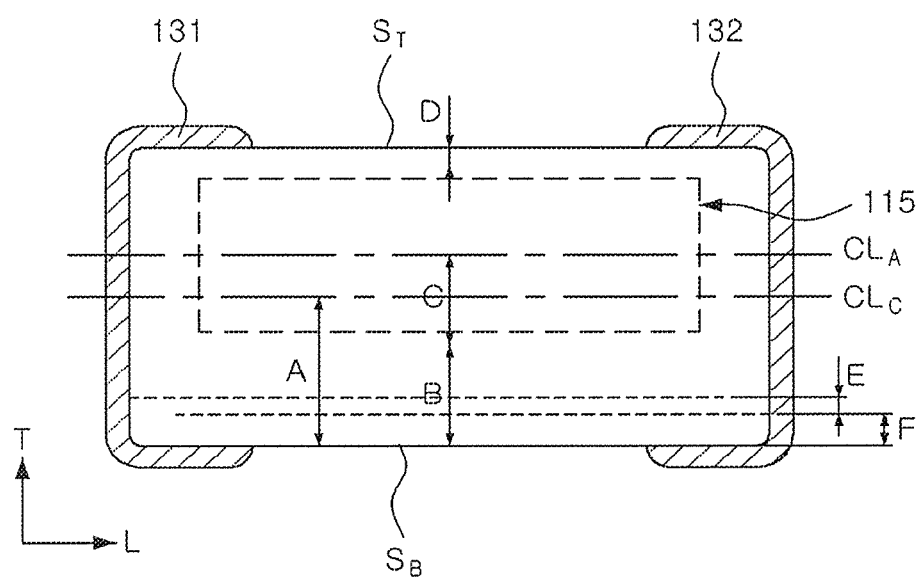
FIG. 3 is a cross-sectional view schematically showing the multilayered ceramic capacitor of FIG. 1, cut in the length direction thereof, to illustrate dimensional relationships among components included in the multilayered ceramic capacitor.

Referring to FIG. 3, A is defined as ½ of an overall thickness of the ceramic body 110, B is defined as a thickness of the lower cover layer 113, C is defined as ½ of an overall thickness of the active layer 115, D is defined as a thickness of the upper cover layer 112, E is defined as an overall thickness of the first and second internal electrodes 123 and 124 formed inside the lower cover layer 113, and F is defined as a thickness of a part of the lower cover layer 113 in which the first and second internal electrodes 123 and 124 are not formed.

Here, the overall thickness of the ceramic body 110 refers to a distance between the top surface ($S_T$) and the bottom surface ($S_B$) of the ceramic body 110. The overall thickness of the active layer 115 refers to a distance between an upper surface of the first internal electrode 121 located at the uppermost portion of the active layer 115 to a lower surface of the second internal electrode 122 located at the lowermost portion of the active layer 115.

In addition, the thickness of the lower cover layer 113 (B) refers to a distance between a lower surface of the second internal electrode 122 located at the lowermost portion in the thickness direction of the active layer 115 to the bottom surface ($S_B$) of the ceramic body 110, and the thickness of the upper cover layer 112 (D) refers to a distance between an upper surface of the first internal electrode 121 located at the uppermost portion in the thickness direction of the active layer 115 to the top surface ($S_T$) of the ceramic body 110.

When voltages having different polarities are applied to the first and second external electrodes 131 and 132 formed on both ends of the multilayered ceramic capacitor 100, the ceramic body 110 expands and shrinks in the thickness direction thereof due to an inverse piezoelectric effect of the dielectric layers 111, and both ends of the first and second external electrodes 131 and 132 expand and shrink, contrary to the expansion and shrinkage of the ceramic body 110 in the thickness direction of the ceramic body 110, due to the Poisson effect.

Here, a center of the active layer 115 may correspond to portions of the first and second external electrodes 131 and 132 corresponding to both ends of the multilayered ceramic capacitor in the length direction thereof in which significant expansion and shrinkage occur, which becomes a factor causing acoustic noise.

That is, in the present embodiment, in order to reduce acoustic noise, points of inflection (PI) formed on respective end surfaces of the ceramic body 110 may be formed to have a height corresponding to or lower than a center ($CL_C$) of the thickness of the ceramic body 110, due to a difference between a deformation rate occurring in the center ($CL_A$) of the active layer 115 and a deformation rate occurring in the lower cover layer 113, during the application of voltage thereto.

Here, in order to further reduce acoustic noise, a ratio of deviation between the center ($CL_A$) of the active layer 115 and the center ($CL_C$) of the ceramic body 110, (B+C)/A, may satisfy $1.063 \leq (B+C)/A \leq 1.745$.

In addition, the ratio of the thickness (D) of the upper cover layer 112 to the thickness (B) of the lower cover layer 113, D/B, may satisfy $0.021 \leq D/B \leq 0.422$.

In addition, the ratio of the thickness (B) of the lower cover layer 113 to ½ (A) of the thickness of the ceramic body 110, B/A, may satisfy $0.329 \leq B/A \leq 1.522$.

In addition, the ratio of ½ (C) of the thickness of the active layer 115 to the thickness (B) of the lower cover layer 113, C/B, may satisfy $0.146 \leq C/B \leq 2.458$.

Experimental Example

Multilayered ceramic capacitors according to the inventive examples and comparative examples of the present invention were manufactured as follows.

A slurry including a powder of, for example, barium titanate ($BaTiO_3$) or the like, was coated and dried on carrier films, to prepare a plurality of ceramic green sheets having a thickness of 1.8 μm.

Then, a conductive paste for a nickel internal electrode was coated on the ceramic green sheets by using a screen, to form internal electrodes.

The ceramic green sheets were laminated in an amount of about 370 layers while ceramic green sheets not having internal electrodes formed thereon, rather than the ceramic green sheets having internal electrodes formed thereon, were laminated in greater numbers in a lower part of the laminate than in an upper part thereof. This laminate was subjected to isostatic pressing at 85° C. in the pressure conditions of 1000 kgf/cm².

The ceramic laminate after completion of pressing was cut into individual chips, and then the cut chip was subjected to debindering at 230° C. in the air atmosphere for 60 hours.

After that, the resultant chip was fired in the reducing atmosphere under an oxygen partial pressure of $10^{-11}$ atm to $10^{-10}$ atm, lower than the equilibrium oxygen partial pressure of Ni/NiO, such that the internal electrodes are not oxidized, at 1200° C. The chip size of a multilayered chip capacitor after firing was about 1.64 mm×0.88 mm (L×W, 1608 size). Here, the tolerance was within a range of ±0.1 mm in length×width (L×W), and when the range is satisfied, acoustic noise was measured by experimentation.

Then, an external electrode forming process, a plating process, and the like were carried out to manufacture multilayered ceramic capacitors.

TABLE 1

| Sample | A (μm) | B (μm) | C (μm) | D (μm) | (B + C)/A | B/A | D/B | C/B | AN (dB) | Capacitance Implementation Ratio |
|---|---|---|---|---|---|---|---|---|---|---|
| 1* | 405.5 | 40.2 | 365.4 | 39.9 | 1.000 | 0.099 | 0.993 | 9.090 | 29.5 | OK |
| 2* | 436.0 | 70.4 | 365.9 | 69.7 | 1.001 | 0.161 | 0.990 | 5.197 | 25.7 | OK |
| 3* | 455.5 | 90.8 | 364.3 | 91.5 | 0.999 | 0.199 | 1.008 | 4.012 | 23.1 | OK |
| 4* | 508.1 | 24.9 | 361.1 | 269.1 | 0.760 | 0.049 | 10.807 | 14.502 | 31.2 | OK |
| 5* | 456.6 | 25.2 | 360.1 | 167.8 | 0.844 | 0.055 | 6.659 | 14.290 | 32.5 | OK |
| 6* | 527.3 | 30.2 | 191.0 | 642.4 | 0.419 | 0.057 | 21.272 | 6.325 | 30.3 | OK |
| 7* | 414.5 | 30.9 | 188.8 | 420.4 | 0.530 | 0.075 | 13.605 | 6.110 | 30.5 | OK |
| 8* | 516.2 | 39.4 | 360.7 | 271.5 | 0.775 | 0.076 | 6.891 | 9.155 | 28.2 | OK |

TABLE 1-continued

| Sample | A (μm) | B (μm) | C (μm) | D (μm) | (B + C)/A | B/A | D/B | C/B | AN (dB) | Capacitance Implementation Ratio |
|---|---|---|---|---|---|---|---|---|---|---|
| 9* | 446.0 | 39.8 | 365.5 | 121.2 | 0.909 | 0.089 | 3.045 | 9.183 | 29.1 | OK |
| 10* | 469.1 | 40.6 | 364.2 | 169.1 | 0.863 | 0.087 | 4.165 | 8.970 | 27.9 | OK |
| 11* | 416.2 | 40.7 | 360.7 | 70.3 | 0.964 | 0.098 | 1.727 | 8.862 | 28.4 | OK |
| 12* | 428.3 | 40.8 | 360.0 | 95.7 | 0.936 | 0.095 | 2.346 | 8.824 | 28.9 | OK |
| 13* | 495.9 | 40.9 | 364.9 | 221.0 | 0.818 | 0.082 | 5.403 | 8.922 | 28.1 | OK |
| 14* | 435.9 | 25.0 | 421.3 | 4.2 | 1.024 | 0.057 | 0.168 | 16.852 | 31.6 | OK |
| 15* | 420.7 | 70.4 | 365.9 | 39.1 | 1.037 | 0.167 | 0.555 | 5.197 | 25.7 | OK |
| 16 | 431.7 | 94.8 | 364.3 | 40.0 | 1.063 | 0.220 | 0.422 | 3.843 | 19.9 | OK |
| 17 | 443.0 | 103.8 | 389.1 | 4.0 | 1.113 | 0.234 | 0.039 | 3.749 | 19.3 | OK |
| 18 | 443.7 | 119.8 | 363.2 | 41.1 | 1.089 | 0.270 | 0.343 | 3.032 | 18.7 | OK |
| 19 | 447.1 | 147.3 | 362.1 | 22.7 | 1.139 | 0.329 | 0.154 | 2.458 | 17.9 | OK |
| 20 | 452.8 | 164.7 | 360.2 | 20.4 | 1.159 | 0.364 | 0.124 | 2.187 | 17.3 | OK |
| 21 | 448.7 | 170.3 | 361.0 | 5.1 | 1.184 | 0.380 | 0.030 | 2.120 | 17.2 | OK |
| 22 | 470.7 | 170.4 | 365.4 | 40.2 | 1.138 | 0.362 | 0.236 | 2.144 | 17.4 | OK |
| 23 | 491.9 | 220.3 | 360.8 | 41.8 | 1.181 | 0.448 | 0.190 | 1.638 | 16.9 | OK |
| 24 | 500.6 | 270.2 | 360.5 | 9.9 | 1.260 | 0.540 | 0.037 | 1.334 | 16.8 | OK |
| 25 | 516.9 | 270.4 | 361.8 | 39.7 | 1.223 | 0.523 | 0.147 | 1.338 | 16.7 | OK |
| 26 | 502.1 | 364.9 | 312.3 | 14.7 | 1.349 | 0.727 | 0.040 | 0.856 | 16.6 | OK |
| 27 | 407.5 | 421.8 | 189.1 | 14.9 | 1.499 | 1.035 | 0.035 | 0.448 | 16.6 | OK |
| 28 | 445.8 | 493.3 | 179.3 | 39.7 | 1.509 | 1.107 | 0.080 | 0.363 | 16.5 | OK |
| 29 | 483.7 | 632.0 | 160.1 | 15.2 | 1.638 | 1.307 | 0.024 | 0.253 | 16.4 | OK |
| 30 | 520.0 | 643.4 | 190.7 | 15.2 | 1.604 | 1.237 | 0.024 | 0.296 | 16.4 | OK |
| 31 | 486.4 | 685.3 | 121.1 | 45.3 | 1.658 | 1.409 | 0.066 | 0.177 | 16.4 | OK |
| 32 | 507.2 | 742.7 | 120.8 | 30.1 | 1.702 | 1.464 | 0.041 | 0.163 | 16.4 | OK |
| 33 | 515.2 | 773.9 | 118.2 | 20.1 | 1.732 | 1.502 | 0.026 | 0.153 | 16.4 | OK |
| 34 | 524.5 | 798.2 | 116.9 | 16.9 | 1.745 | 1.522 | 0.021 | 0.146 | 16.3 | OK |
| 35* | 533.4 | 832.4 | 109.8 | 14.8 | 1.766 | 1.561 | 0.018 | 0.132 | 16.3 | NG |
| 36* | 533.3 | 841.1 | 105.3 | 14.9 | 1.775 | 1.577 | 0.018 | 0.125 | 16.3 | NG |
| 37* | 534.1 | 849.7 | 101.2 | 16.1 | 1.780 | 1.591 | 0.019 | 0.119 | 16.3 | NG |

*Comparative Example,
AN: acoustic noise

Table 1 above shows dimension data of respective parts of the multilayered ceramic capacitor 100, measured based on an image obtained by scanning a cross-section of the ceramic body 110, cut in the length direction (L) and the thickness direction (T) in the central portion of the ceramic body 110 of the multilayered ceramic capacitor 100 in the width (W) direction thereof, using a scanning electron microscope (SEM), as shown in FIG. 3.

Here, as described above, A was defined as ½ of an overall thickness of the ceramic body 110, B was defined as a thickness of the lower cover layer 113, C was defined as ½ of an overall thickness of the active layer 115, and D was defined as a thickness of the upper cover layer 112.

In order to measure acoustic noise, one sample (multilayered chip capacitor) per a substrate for measuring acoustic noise was mounted on a printed circuit board while upper and lower directions of the sample were differentiated from each other, and then the printed circuit board was seated on a measuring jig.

In addition, DC voltage and voltage variations were applied to both terminals of the sample seated on the measuring jig by using a DC power supply and a function generator. Acoustic noise was measured through a microphone installed directly above the printed circuit board.

In Table 1 above, Samples 1 to 3 are comparative examples having a symmetrical cover structure in which the thickness (B) of the lower cover layer 113 is approximately similar to the thickness (D) of the upper cover layer 112, and Samples 4 to 13 are comparative examples having a structure in which the thickness (D) of the upper cover layer 112 is thicker than the thickness (B) of the lower cover layer 113.

In addition, Samples 14, 15, and 35 to 37 are comparative examples having a structure in which the thickness (B) of the lower cover layer 113 is thicker than the thickness (D) of the upper cover layer 112, and Samples 16 to 34 are inventive examples according to the embodiment of the invention.

Here, in the case in which the (B+C)/A value is approximately 1, the center of the active layer 115 does not largely deviate from the center of the ceramic body 110. In Samples 1 to 3 having a symmetrical cover structure in which the thickness (B) of the lower cover layer 113 is approximately similar to the thickness (D) of the upper cover layer 112, the (B+C)/A values thereof are approximately 1.

In the case in which the (B+C)/A value is greater than 1, the center of the active layer 115 upwardly deviates from the center of the ceramic body 110. When the (B+C)/A value is smaller than 1, the center of the active layer 115 downwardly deviates from the center of the ceramic body 110.

Referring to Table 1 above, in Samples 16 to 34 in which the ratio of deviation between the center of the active layer 115 from the center of the ceramic body 110, (B+C)/A, satisfies 1.063≤(B+C)/A≤1.745, it can be confirmed that acoustic noise values thereof were significantly reduced to below 20 dB.

In addition, Samples 1 to 15 in which the ratio of deviation between the center of the active layer 115 and the center of the ceramic body 110, (B+C)/A, is below 1.063, has a structure in which the center of the active layer 115 scarcely deviates from the center of the ceramic body 110 or the center of the active layer 115 downwardly deviates from the center of the ceramic body 110.

In the forgoing samples 1 to 15 of which the (B+C)/A value is below 1.063, acoustic noise values thereof were 25 to 32.5 dB, and thus it can be confirmed that the samples 1 to 15 had no effect of reducing acoustic noise as compared with the inventive examples according to the embodiment of the present invention.

In addition, in Samples 35 to 37 in which the ratio of deviation between the center of the active layer 115 and the center of the ceramic body 110, (B+C)/A, is above 1.745, the capacitance in comparison with the target capacitance was low, causing defective capacitance.

In Table 1 above, in the case that "NG" is marked in the column "Capacitance Implementation Ratio" (that is, the ratio of capacitance to target capacitance), the value of capacitance to target capacitance is below 80% when the target capacitance value is 100%.

In addition, in the inventive examples in which the ratio of the thickness (D) of the upper cover layer 112 to the thickness (B) of the lower cover layer 113, D/B, satisfies 0.021≤D/B≤0.422, it can be confirmed that acoustic noise was significantly reduced.

Whereas, in the comparative examples in which the ratio of the thickness (D) of the upper cover layer 112 to the thickness (B) of the lower cover layer 113, D/B, is above 0.422, it can be confirmed that there was no effect in reducing acoustic noise.

When the ratio of the thickness (D) of the upper cover layer 112 to the thickness (B) of the lower cover layer 113, D/B, is below 0.021, the thickness (B) of the lower cover layer 113 is excessively greater than the thickness (D) of the upper cover layer 112, resulting in cracking or delamination, and the capacitance in comparison with target capacitance is low, causing defective capacitance.

In Samples 19 to 34 of the inventive examples in which the ratio of the thickness (B) of the lower cover layer 113 to the thickness (A) of the ceramic body 110, B/A, and the ratio of the thickness (C) of the active layer 115 to the thickness (B) of the lower cover layer 113, C/B, satisfy, 0.329≤B/A≤1.522 and 0.146≤C/B≤2.458, it can be confirmed that acoustic noise values therefor were further decreased to below 18 dB.

Whereas, in Samples 35 to 37 in which the ratio of the thickness (B) of the lower cover layer 113 to the thickness (A) of the ceramic body 110, B/A, is above 1.522 or the ratio of the thickness (C) of the active layer 115 to the thickness (B) of the lower cover layer 113, C/B, is below 0.146, it can be confirmed that capacitance, in comparison with target capacitance, was low, causing defective capacitance.

Table 2 below shows changes of ESL (here, frequency: 200 MHz) and acoustic noise (dB) according to the thickness of the lower cover layer 113 and the overall thickness of the first and second internal electrodes 123 and 124 formed inside the lower cover layer 113.

Referring to Table 2, it can be confirmed that ESL exceeded 200 pH, in Sample 9 as an example of the related art in which the first and second internal electrodes 123 and 124 are not formed inside the lower cover layer 113, and in Sample 8 in which thickness (F) is above 100 μm.

In addition, it can be confirmed that acoustic noise exceeded 20 dB in Sample 1 in which the ratio of thickness of the first and the second internal electrodes 123 and 124 to the overall thickness of the lower cover layer 113, E/B, is above 0.5.

Therefore, it can be seen that (F) and (E/B) were 100 μm or less and 0.5 or smaller, respectively, in order to maintain ESL and acoustic noise at a predetermined level or lower.

Figure 9:
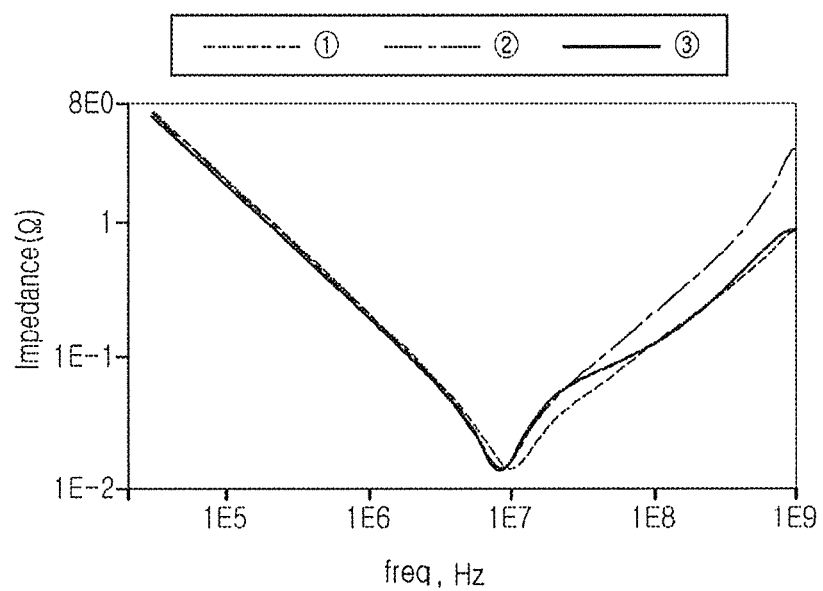
FIG. 9 is a graph showing an impedance change to frequency for a multilayered ceramic capacitor of the related art, a multilayered ceramic capacitor having a lower cover layer, and a multilayered ceramic capacitor having a lower cover layer of the present embodiment in which first and second internal electrodes are further formed.

FIG. 9 is a graph showing an impedance change to frequency for a multilayered ceramic capacitor of the related art (hereinafter, "Comparative Example 1"), a multilayered ceramic capacitor having a lower cover layer (hereinafter, "Comparative Example 2"), and a multilayered ceramic capacitor having a lower cover layer in which first and second internal electrodes are further formed (hereinafter, "Inventive Example").

Referring to FIG. 9, Comparative Examples 1 and 2 had approximately similar impedance values at low frequencies, but the impedance of Comparative Example 2 was increased relatively more than the impedance of Comparative Example 1 and Inventive Example when the frequency exceeded a predetermined value. It can be seen that, here, the impedance of Inventive Example was nearly similar to the impedance of Comparative Example 1 in which the lower cover layer 113 is not formed.

Figure 10:
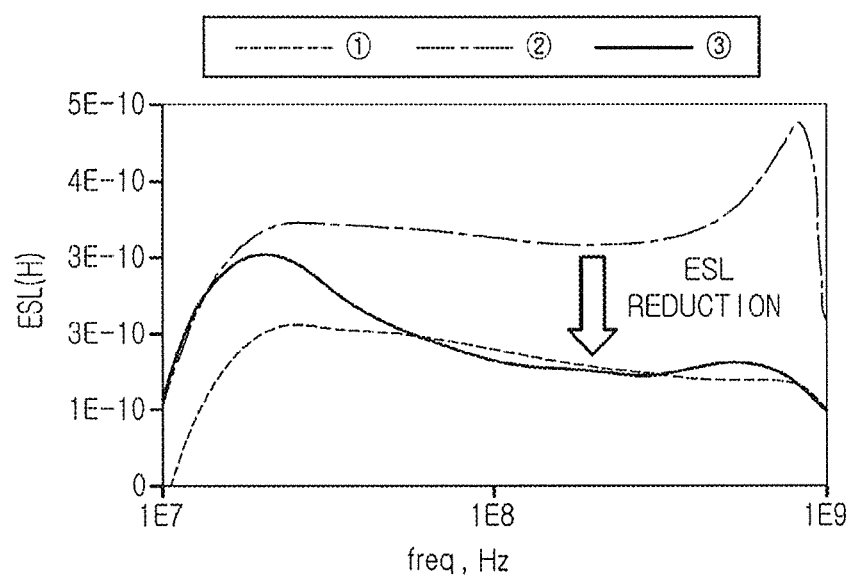
FIG. 10 is a graph showing an ESL change to frequency for a multilayered ceramic capacitor of the related art, a multilayered ceramic capacitor having a lower cover layer, and a multilayered ceramic capacitor having a lower cover layer of the present embodiment in which first and second internal electrodes are further formed.

FIG. 10 is a graph showing an ESL change to frequency for Comparative Examples 1 and 2 and Inventive Example.

Referring to FIG. 10, it can be seen that ESL of Inventive Example was higher than that of Comparative Example 1 and approximately similar to that of Comparative Example 2 at relatively low frequencies, but was significantly lowered when the frequency exceeded a predetermined level, and thus remarkably lower than that of Comparative Example 2 and approximately similar to that of Comparative Example 1 in which the lower cover layer 113 is not formed.

Therefore, the multilayered ceramic capacitor 100 according to the present embodiment may lower ESL to a level similar to that of the product of the related art in which the lower cover layer 113 is not formed while having a structure of reducing acoustic noise.

TABLE 2

| Sample | Thickness (A) (μm) | Thickness (B) (μm) | Thickness (C) (μm) | Thickness (D) (μm) | Thickness (E) (μm) | Thickness (F) (μm) | E/B | ESL (pH) | Acoustic Noise (dB) |
|---|---|---|---|---|---|---|---|---|---|
| 1 | 510.0 | 251.2 | 364.8 | 40.1 | 150.1 | 40.4 | 0.598 | 149 | 20.1 |
| 2 | 509.7 | 250.0 | 365.2 | 39.8 | 100.2 | 40.0 | 0.401 | 149 | 17.1 |
| 3 | 510.2 | 249.7 | 365.9 | 40.5 | 71.8 | 40.3 | 0.288 | 151 | 16.9 |
| 4 | 508.5 | 250.8 | 364.3 | 40.8 | 41.1 | 40.1 | 0.164 | 150 | 16.8 |
| 5 | 509.8 | 249.2 | 364.2 | 40.4 | 21.4 | 40.2 | 0.086 | 148 | 16.7 |
| 6 | 510.1 | 249.8 | 364.0 | 40.1 | 21.0 | 72.1 | 0.084 | 161 | 16.8 |
| 7 | 509.5 | 249.9 | 364.2 | 40.5 | 20.8 | 100.0 | 0.083 | 169 | 16.9 |
| 8 | 510.4 | 251.0 | 364.8 | 40.2 | 20.9 | 149.5 | 0.083 | 211 | 16.8 |
| 9 | 510.2 | 250.1 | 364.5 | 40.1 | 0.0 | — | 0 | 320 | 16.8 |

In Table 2 above, (E) represents overall thickness of the first and second internal electrodes 123 and 124 formed inside the lower cover layer 113, and (F) represents thickness from the second internal electrodes 124 at the lowermost location to the bottom surface (SB) of the ceramic body 110.

Figure 4:
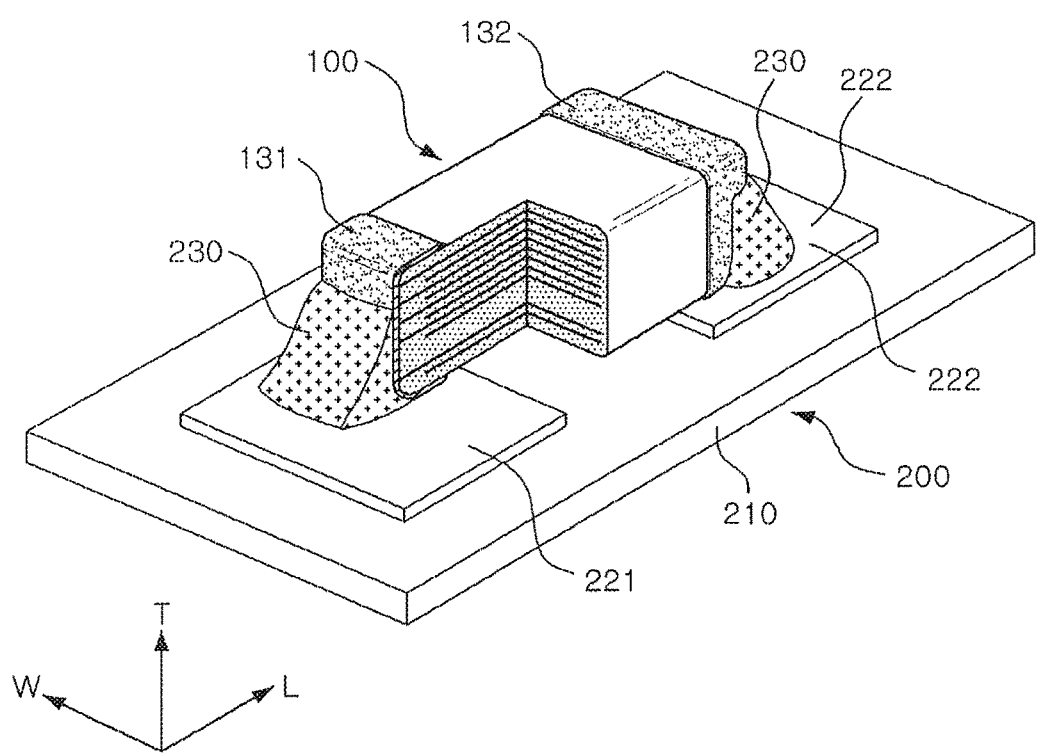
FIG. 4 is a partially cutaway perspective view showing a state in which the multilayered ceramic capacitor of FIG. 1 is mounted on a printed circuit board.
Figure 5:
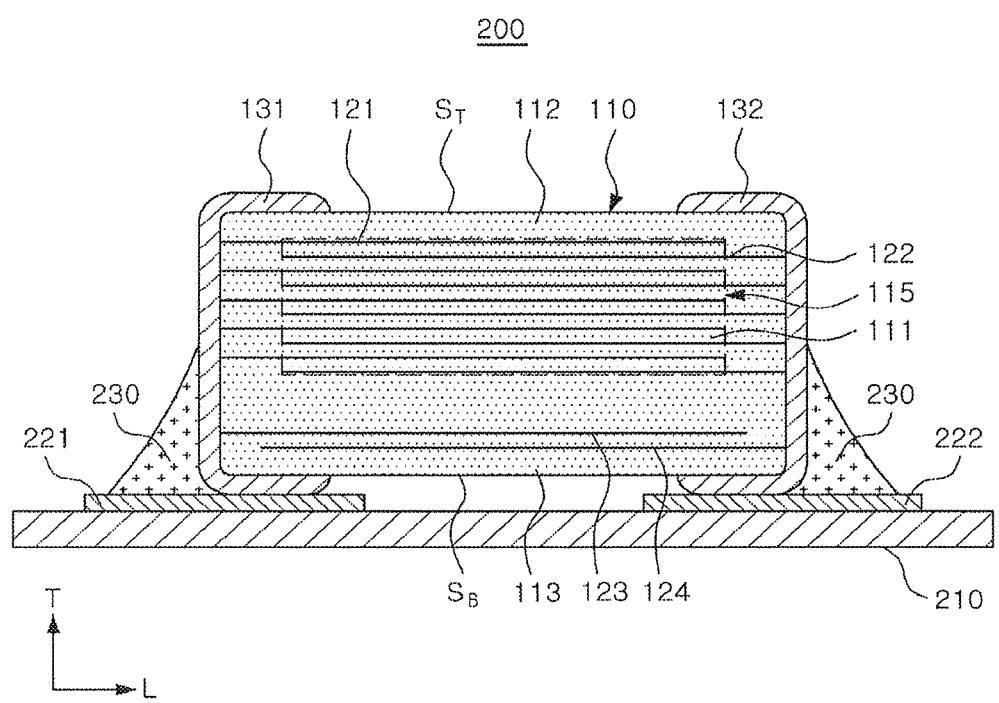
FIG. 5 is a cross-sectional view showing the multilayered ceramic capacitor and printed circuit board of FIG. 4, cut in the length direction thereof.

Mounting Structure of Circuit Board Having Multilayered Ceramic Capacitor Mounted Thereon Referring to FIGS. 4 and 5, a mounting board 200 for the multilayered ceramic capacitor 100 according to the present embodiment may include a printed circuit board 210 on which the multilayered ceramic capacitor 100 is horizontally mounted; and first and second electrode pads 221 and 222 spaced apart from each other on an upper surface of the printed circuit board 210.

Here, the multilayered ceramic capacitor 100 may be electrically connected to the printed circuit board 210 by soldering 230 while the lower cover layer 113 is located below and the first and second external electrodes 131 and 132 are positioned on and contacted with the first and second electrode pads 221 and 222, respectively.

When voltage is applied while the multilayered ceramic capacitor 100 is mounted on the printed circuit board 210 as described above, acoustic noise may be generated.

Here, the size of the first and second electrode pads 221 and 222 may be an index for determining the amount of soldering 230 which connects the first and second external electrodes 131 and 132 of the multilayered ceramic capacitor 100 and the first and second electrode pads 221 and 222, and the level of acoustic noise may be controlled depending on the amount of soldering 230.

Figure 6:
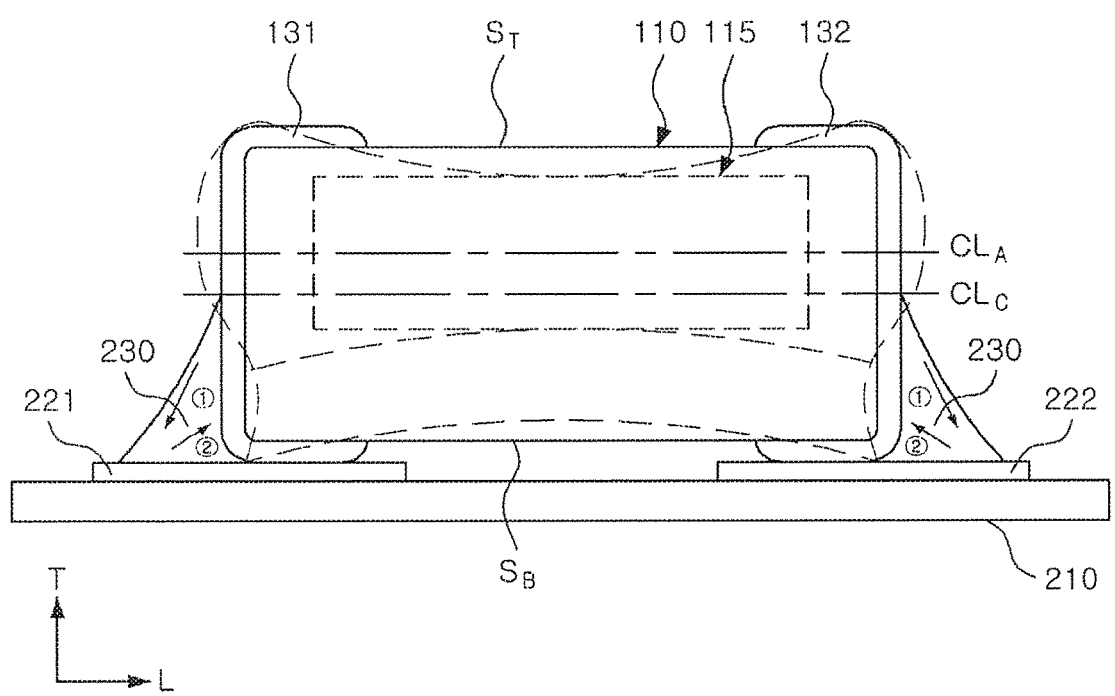
FIG. 6 is a cross-sectional view schematically showing a state in which the multilayered ceramic capacitor of FIG. 4 is transformed due to the application of voltage when the multilayered ceramic capacitor is mounted on the printed circuit board.

Referring to FIG. 6, when voltages having different polarities are applied to the first and second external electrodes 131 and 132 formed on both ends of the multilayered ceramic capacitor 100 while the multilayered ceramic capacitor 100 is mounted on the printed circuit board 210, the ceramic body 110 expands and shrinks in the thickness direction thereof due to an inverse piezoelectric effect of the dielectric layers 111, and both ends of the first and second external electrodes 131 and 132 expand and shrink, contrary to the expansion and shrinkage of the ceramic body 110 in the thickness direction, due to the Poisson effect.

Here, a center of the active layer 115 corresponds to portions of the first and second external electrodes 131 and 132 corresponding to both ends of the multilayered ceramic capacitor in the length direction thereof in which significant expansion and shrinkage occur, and this becomes a factor causing acoustic noise.

When both end surfaces in the length direction of the multilayered ceramic capacitor 100 significantly expands, a force (①) of allowing an upper portion of the soldering 230 to be pushed out to the outside is generated due to expansion and a shrinkage force (②) of allowing a lower portion of the soldering 230 to be pushed to the external electrode is generated due to the force (①).

Therefore, when points of inflection formed on respective end surfaces of the ceramic body 110 is formed to have a height corresponding to or lower than the soldering 230 due to a difference between a deformation rate occurring in a center of the active layer 115 ($CL_A$) and a deformation rate occurring in the lower cover layer 113, during the application of voltage thereto, acoustic noise may be further reduced.

Packing Unit for Multilayered Ceramic Capacitor

Figure 7:
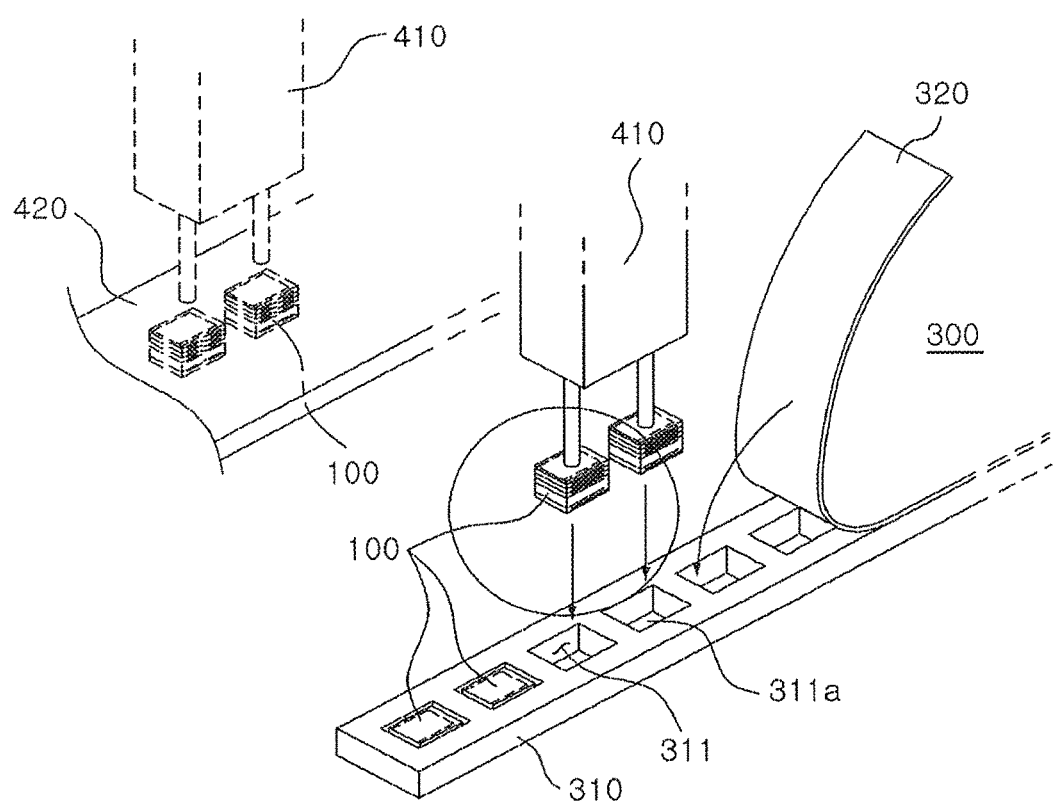
FIG. 7 is a perspective view schematically showing a state in which the multilayered ceramic capacitor according to the embodiment of the present invention is mounted on a packing unit.

Referring to FIG. 7, a packing unit 300 for a multilayered chip capacitor according to the present embodiment may include a packing sheet 310 having a plurality of receiving parts 311 formed to correspond to multilayered ceramic capacitors 100 so as to receive the multilayered ceramic capacitors 100 therein, respectively.

Here, the respective multilayered ceramic capacitors 100 are maintained by an electronic product arranging apparatus 420 such that the first and second internal electrodes 121 and 122 are horizontally arranged, and may be conveyed to the packing sheet 310 by using a conveying apparatus 410.

The thus conveyed multilayered ceramic capacitors 100 may be received in the receiving parts 311 such that respective lower cover layers 113 of the multilayered ceramic capacitors 100 face a bottom surface 311a of the receiving part 311.

In addition, a packing film 320 may be attached to one surface of the packing sheet 310 so as to seal the receiving parts 311 in which the multilayered ceramic capacitors 100 are respectively received.

Figure 8:
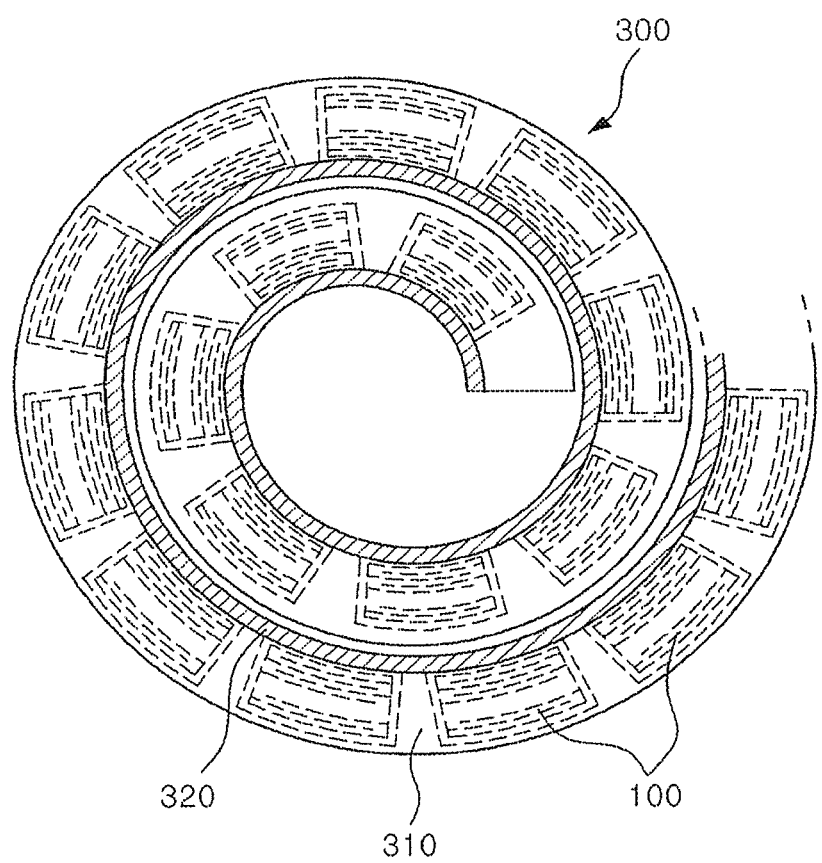
FIG. 8 is a cross-sectional view schematically showing a state in which the packing unit of FIG. 7 is wound as a reel.

Meanwhile, referring to FIG. 8, the thusly formed packing sheet 310 may be continuously wound as a reel.

As set forth above, according to the embodiments of the invention, vibrations generated from the multilayered ceramic capacitor may be decreased and thus acoustic noise generated from the printed circuit board may be reduced, and ESL may be maintained at a predetermined level or lower.

While the present invention has been shown and described in connection with the embodiments, it will be apparent to those skilled in the art that modifications and variations can be made without departing from the spirit and scope of the invention as defined by the appended claims.

What is claimed is:

1. A multilayered ceramic capacitor, comprising:
   a ceramic body having a plurality of dielectric layers laminated therein;
   an active layer including a plurality of first and second internal electrodes having individual dielectric layers interposed therebetween to form capacitance, the first and second internal electrodes being alternately exposed through respective end surfaces of the ceramic body;
   an upper cover layer formed above the active layer;
   a lower cover layer formed below the active layer, the lower cover layer being thicker than the upper cover layer;
   first and second external electrodes covering both end surfaces of the ceramic body; and
   at least one pair of first and second internal electrodes repeatedly formed inside the lower cover layer with the dielectric layer interposed therebetween, the first and second internal, electrodes being alternately exposed through both end surfaces of the lower cover layer,
   wherein $1.063 \leq (B+C)/A \leq 1.745$ and $0.083 \leq E/B \leq 0.5$, in which A is ½ of an overall thickness of the ceramic body, B is a thickness of the lower cover layer, C is ½ of an overall thickness of the active layer, E is an overall thickness of the first and second internal electrodes formed inside the lower cover layer, $(B+C)/A$ is a ratio of deviation between a center of the active layer and a center of the ceramic body, and $E/B$ is a ratio of the overall thickness of the first and second internal electrodes formed inside the lower cover layer to the thickness of the lower cover layer, and
   wherein F is 100 μm or smaller, in which F is a thickness from a lowermost edge of the first or second internal electrode formed inside the lower cover layer to a bottom surface of the ceramic body.

2. The multilayered ceramic capacitor of claim 1, wherein, $0.021 \leq D/B \leq 0.422$ in which D is a thickness of the upper cover layer and D/B is a ratio of the thickness (D) of the upper cover layer to the thickness (B) of the lower cover layer.

3. The multilayered ceramic capacitor of claim 1, wherein $0.329 \leq B/A \leq 1.522$ in which B/A is a ratio of the thickness (B) of the lower cover layer to (A) ½ of the overall thickness of the ceramic body.

4. The multilayered ceramic capacitor of claim 1, wherein 0.146≤C/B=2.458 in which C/B is a ratio of (C) ½ of the overall thickness of the active layer to the thickness (B) of the lower cover layer.

5. The multilayered ceramic capacitor of claim 1, wherein points of inflection formed on respective end surfaces of the ceramic body are formed to have a height corresponding to or lower than a center of the ceramic body in the thickness direction, due to a difference between a deformation rate occurring in the center of the active layer and a deformation rate occurring in the lower cover layer, during the application of voltage thereto.

6. A mounting structure of a circuit board having a multilayered ceramic capacitor mounted thereon, the mounting structure comprising:
   a printed circuit board having first and second electrode pads formed thereon; and
   a multilayered ceramic capacitor mounted on the printed circuit board,
   the multilayered ceramic capacitor including:
      a ceramic body having a plurality of dielectric layers laminated therein;
      an active layer including a plurality of first and second internal electrodes having the dielectric layer interposed therebetween, the first and second internal electrodes being alternately exposed through both end surfaces of the ceramic body;
      an upper cover layer formed above the active layer;
      a lower cover layer formed below the active layer, the lower cover layer being thicker than the upper cover layer and having at least one pair of first and second internal electrodes alternately exposed through both end surfaces thereof; and
      first and second external electrodes formed on both end surfaces of the ceramic body to be electrically connected to exposed portions of the first and second internal electrodes and soldering-connected to first and second electrode pads,
   wherein 1.063≤(B+C)/A≤1.745 and 0.083≤E/B≤0.5, in which A is ½ of an overall thickness of the ceramic body, B is a thickness of the lower cover layer, C is ½ of an overall thickness of the active layer, E is an overall thickness of the first and second internal electrodes formed inside the lower cover layers, (B+C)/A is a ratio of deviation between a center of the active layer and a center of the ceramic body, and E/B is a ratio of the overall thickness of the first and second internal electrodes formed inside the lower cover layer to the thickness of the lower cover layer, and
   wherein F is 100 μm or smaller, in which F is a thickness from a lowermost edge of the first or second internal electrode formed inside the lower cover layer to a bottom surface of the ceramic body.

7. The mounting structure of claim 6, wherein points of inflection formed on respective end surfaces of the ceramic body are formed to have a height corresponding to or lower than soldering, due to a difference between a deformation rate occurring in the center of the active layer and a deformation rate occurring in the lower cover layer, during the application of voltage thereto.

8. A packing unit for a multilayered ceramic capacitor, the packing unit comprising:
   one or more multilayered ceramic capacitors, the one or more multilayered ceramic capacitors including:
      a ceramic body having a plurality of dielectric layers laminated therein;
      an active layer including a plurality of first and second internal electrodes having the dielectric layer interposed therebetween, the first and second internal electrodes being alternately exposed through both end surfaces of the ceramic body;
      an upper cover layer formed above the active layer;
      a lower cover layer formed below the active layer, the lower cover layer being thicker than the upper cover layer and having at least one pair of first and second internal electrodes alternately exposed through both end surfaces thereof; and
      first and second external electrodes formed on both end surfaces of the ceramic body and electrically connected to exposed portions of the first and second internal electrodes,
   wherein 1.063≤(B+C)/A≤1.745 and 0.083≤E/B≤0.5, in which A is ½ of an overall thickness of the ceramic body, B is a thickness of the lower cover layer, and C is ½ of an overall thickness of the active layer, E is an overall thickness of the first and second internal electrodes formed inside the lower cover layer, (B+C)/A is a ratio of deviation between a center of the active layer and a center of the ceramic body, and E/B is a ratio of the overall thickness of the first and second internal electrodes formed inside the lower cover layer to the thickness of the lower cover layer, and wherein F is 100 μm or smaller, in which F is a thickness from a lowermost edge of the first or second internal electrode formed inside the lower cover layer to a bottom surface of the ceramic body; and
   a packing sheet having a plurality of receiving parts in which the multilayered ceramic capacitors are respectively received, the lower cover layer of the multilayered ceramic capacitor facing a bottom surface of the receiving part.

9. The packing unit of claim 8, further comprising
   a packing film attached to one surface of the packing sheet so as to seal the receiving parts in which the multilayered ceramic capacitors are respectively received.

10. The packing unit of claim 8, wherein the packing sheet is wound as a reel.

* * * * *